United States Patent

[11] 3,615,689

[72] Inventors Sidney Malinow
 Hickory Hills;
 David R. Erickson, Downers Grove;
 Charles A. Overley, Chicago, all of Ill.
[21] Appl. No. 719,733
[22] Filed Apr. 8, 1968
[45] Patented Oct. 26, 1971
[73] Assignee Swift & Company
 Chicago, Ill.

[54] POULTRY PROCESSING
 3 Claims, No Drawings

[52] U.S. Cl. ................................................ 99/107
[51] Int. Cl. ............................................ A22c 21/00
[50] Field of Search ................................ 99/107, 118

[56] References Cited
UNITED STATES PATENTS

| | | | |
|---|---|---|---|
| 2,418,914 | 4/1947 | Tichy | 99/107 |
| 2,629,664 | 2/1953 | Watts et al. | 99/107 X |
| 3,366,491 | 1/1968 | Schwall et al. | 99/107 |
| 3,406,081 | 10/1968 | Bauer et al. | 99/107 X |
| 3,298,837 | 1/1967 | Seiden | 99/118 |
| 3,511,164 | 5/1970 | Strandine et al. | 99/107 X |
| 3,556,809 | 1/1971 | Strandine et al. | 99/107 |

OTHER REFERENCES

Bailey, "Industrial Oil and Fat Products," 1964, Published by Interscience Publishers, New York, Page 176, Copy in group 172, U.S. Pat. Off.

Clayton, "Margarine," 1920, Published by Longmans, Green and Co., London, Page 94, article entitled Melting Point. Copy in Group 172, U.S. Pat. Off.

*Primary Examiner*—Hyman Lord
*Attorneys*—Edward T. McCabe and Charles E. Bouton ABSTRACT: Certain eating qualities of meat items, particularly poultry, are improved by injecting therein quantities of an edible emulsion having a melting point between about 76°–110° F. and a relatively narrow plastic range, such as is obtained by emulsifying a minor amount of water with a major amount of vegetable oil product comprised preferably of a lauric acid oil or mixtures of lauric oil and other oils or fats and/or hydrogenated forms and mixtures thereof, using a small amount of a mixed hydrophilic-lipophilic emulsifier and ingredients such as salt, flavoring and coloring materials, etc.

POULTRY PROCESSING

This invention is directed to the processing and improvement of meat products; and more particularly is directed to a composition and method for treating meat items, especially poultry, to improve eating qualities associated with flavor, juiciness, tenderness, and fat content, and to the product produced thereby.

Several improvements in the meat packing art have related to the addition of fatty materials to relatively low-quality red meats. The distinction between high and low quality is greatly dependent upon the degree of marbling of fat throughout the lean tissue. High-quality meat normally contains a substantial amount of such marbling which is commonly regarded as desirable for superior flavor, juiciness, texture and tenderness of the cooked food. It has been rather indiscriminately suggested that animal and vegetable fats and oils, and emulsions thereof, could be injected into red meat to achieve the same desirable qualities. It has also been suggested that formulas for injection may contain flavoring ingredients and even tenderizing enzymes.

It has been suggested, in U.S. Pat. No. 2,418,914 to Tichy, that poultry as well as red meat may be improved by the introduction of various materials including vegetable oils, water, animal fats and butter. Tichy suggests that such materials may be deposited beneath the skin and in the tissue of fowls and the like by a high pressure spray injection which apparently does not create grossly visible openings in the skin. Other prior art, such as the U.S. Pat. No. 3,035,508 to Nelson, has also suggested the injection of various materials, principally solutions of monosodium glutamate, through hollow needles inserted through the skin and into the flesh of a bird.

While the prior art clearly recognizes the value of injecting materials, such as a fat or oil composition, into a meat or poultry item, there is a disadvantage or problem in connection with the tendency of such materials to be expelled or to ooze from the item soon after injection. However, a recent development disclosed in the Schwall, et al., U.S. Pat. No. 3,366,491 benefits by fat later oozing from injection sites to baste the exterior of a food during cooking.

The prior art does not appear to have recognized that many of the fats or oils heretofore suggested may develop undesirable "off" flavors either before or after injection and thereby lessen the quality of such a product. For instance, it is usually desired that the material be injected in a chilled item for bacteriological and storage reasons. Most fats or oils must be substantially heated so as to be in liquid form for injection. In the course of heating and being held at liquifying temperature, off flavors may develop, for instance, butter may turn rancid.

If oils that are normally liquid at low temperatures are utilized, the heating may be avoided but the material will either congeal slowly or not at all and ample time is provided for the elastic properties of the meat to tend to expel the liquid from the site of injection before the product is cooked. Even most of the oils and fats with higher melting points have a relatively wide plastic range, which has meant that during the time required to chill the injected material to a solid there has been substantial loss of liquid from the sites of injection.

In addition to developing "off" flavors or rancidity during the heating of the material prior to injection, some materials, such as butter, may develop undesirable flavors after injection and during storage of the injected items at refrigerated temperatures. If such items are frozen, rancidity or "off" flavors can be developed as the item is thawed and even during the time that the meat is being brought up to cooking temperature. Opportunity for such materials to develop undesirable flavors in the meat item are particularly acute where storage conditions prior to injection have not been carefully controlled.

It is also a significant disadvantage in the processing of poultry according to many of the prior art proposals that the fat or oil material to be injected has actually exceeded in value the item to be improved. Currently whole carcass poultry may be marketed at about 30 per pound to the consumer and butter may cost 60 to 70 per pound. Thus, the addition of such an expensive material as butter to the lower cost poultry will tend to increase the sales price of the product per unit of final weight and make it less attractive to the purchasing consumer.

Accordingly, it is a principal object of the present invention to provide an improved composition and method for adding a fat ingredient to a meat item, and the product thereof, where the composition is easily injected but solidifies promptly so as not to be lost from the product.

Another object of the present invention is to provide an improved composition and method for introducing a fat into a meat item that will not develop "off" flavors or become rancid.

It is still another object of the present invention to provide an improved fat-additive composition that is relatively inexpensive and approximates or is less than the cost per unit basis of the less expensive types of meat.

Generally, the present invention is based upon our discovery that emulsions comprising water and certain specific vegetable oils, and mixtures of oils and fats, possess melting points that fall in an optimum area for purposes of injection, i.e., between about 76°–110° F., and at the same time have a relatively narrow plastic range which means that they set up sharply below the melting temperature. Lauric acid oils, such as coconut oil and palm kernel oil, have been found to be highly advantageous. Lauric acid oils are regarded as having a melting point near 76° F. and a very narrow plastic range. The use of lauric acid oils for the disclosed purpose is believed unobvious, even though the aforementioned characteristics have been well known, as a narrow plastic range has heretofore been thought to be a disadvantage in solid edible products. Certain quantities of other vegetable oils and animal fats may be used in combination with lauric acid oils and indeed vegetable oil that has been partially hydrogenated to a desirable melting point is also useful in the present invention. Due to the temperature melting points of these materials, little, if any, heat need be applied at the point of use to render the material liquid for injection. This usually true even where the material is to be used in a refrigerated atmosphere. Also, the narrow plastic range of the material coupled with moderate melting temperature results in a very rapid congealing once it is injected into an item of meat that has been chilled.

More specifically, we have found that suitable stable oil emulsions have a melting point between about 76°–110° F., preferably between 76°–95° F., and having a relatively narrow plastic range may be prepared by emulsifying an oil or fat composition containing a significant portion of a lauric acid oil, such as coconut oil or a palm kernel oil, with water utilizing a mixed emulsifier having both hydrophilic and lipophilic properties. Such compositions comprise about 40–90 percent oil, 59–9 percent water emulsified with less than 1 percent emulsifier, and may optionally contain small quantities of salt and minor amounts of various spices, colors, preservatives, etc.

Coconut oil is the preferred lauric acid type vegetable oil component. The most desirable formulation that we have devised for the injection of poultry, for example, is comprised of 84 percent coconut oil, 12 percent water, 3 percent salt and about ½ percent of a mixed hydrophilic-lipophilic emulsifier. The remaining ½ percent of constituents are selected flavor (spice) and color additives.

There are many food grade emulsifiers known to the art that are suitable and we prefer an equal part mixture of a hydrophilic emulsifier such as polyoxyethylene sorbitan monoester (suitable commercial materials are sold under the Trademark "Tween"), or polyglycerol esters, and a lipophilic emulsifier such as a monoglyceride (glycerol monosterate), propylene glycol monoesters, or an ester of saturated fatty acid and sorbitan (sorbitan monosterate). The mixed hydrophilic-lipophilic emulsifier contributes to a very smooth emulsion system which may be solidified and remelted without forming small curds such as are observed upon the melting of margarines utilizing solely lipophilic emulsifiers. The latter feature is important as the emulsion may have to be remelted at the time of injection and will always be remelted during cooling of the meat.

The oil fraction of the emulsion should include from 30–100 percent lauric acid oil. The remaining portion of the oil fraction may be made up of one or more vegetable oils or animal fats supplied in an amount that will not greatly alter the melting point and plastic range characteristics of the lauric acid oil. That is, the oil fraction may comprise interesterified or rearranged combinations of vegetable or animal fats plus coconut or palm kernel oil which will simulate the unique and natural properties of coconut and palm kernel oils, i.e., short plastic range, sharp and relatively moderate melting point, and flavor stability. Thus, relatively larger amounts of fats or oils approaching those characteristics may be used in mixture, while lesser amounts of substantially different oils will be acceptable. We have prepared suitable emulsions with mixtures of coconut oil and partially hydrogenated soybean oil (iodine Number 75), corn oil, cocoa butter, lard oil, oleo oil and cottonseed stearine. The total oil fraction should comprise about 40–90 percent of the emulsion, and it is preferred that the composition, for injection into meat, employ 70 percent and more oil. The composition must be a stable water-in-oil emulsion that will not separate; and it has been our experience that the emulsion will display substantially the same melting point (about 76° F. for coconut oil) and plastic range characteristics as the predominate phase, i.e., the oil.

Salt, flavorings and coloring materials can be included in the emulsion, preferably in the aqueous phase as migration to the meat tissue is thereby facilitated. Such ingredients should be added to the aqueous material before the emulsion is formed. Salt may be introduced substantially to the saturation point of the aqueous fraction, but about 3 percent, by weight, of the total emulsion is the preferred amount. Where salt is included, a chelating agent such as EDTA (sodium salt of ethylene diamine teretra acetate) should be present in trace amounts of about 75 p.p.m. of the aqueous phase. Small amounts, usually totaling less than ½ percent of the total emulsion, of water-soluble flavoring materials may be included, such as diacetyl, acetyl methyl carbinol, and lactones.

Emulsions of the foregoing limitations are quite distinct from vegetable oil formulations usually intended for solid foods. Margarines notably differ in that they are designed to be spreadable at room temperature and thereby purposely have a broad plastic range and usually a relatively high melting point near 100° F. Also, margarines normally do not employ any hydrophilic emulsifier which we find to be highly desirable to obtain a smooth emulsion. So-called "liquid margarines" which have very low melting points are designed to remain liquid at refrigeration temperatures and thus are completely unsuitable in the present invention as they would not set up upon injection into a chilled meat item.

The foregoing emulsions of the present invention are believed to be much superior to butter because of lower cost, lower melting point and shorter plastic range. Butter is normally regarded as having a melting point of about 96.8° F., and a significant plastic range (it is highly spreadable at a wide range of room temperatures). Our preferred formulation, however, has a melting point close to that of coconut oil, which is about 76° F., and all of our formulations have a plastic range substantially narrower than butter and are not deemed to be spreadable.

It has been found that the introduction of between 1 and 11 percent of the preferred formula to poultry flesh, for example, greatly enhances the eating qualities; and a majority of the members of trained taste panels have shown preference for poultry treated in this manner over untreated poultry. The actual quantity of material to be added to a food product may be regulated by state or federal acts. For improved eating qualities, 3 percent by weight of a whole poultry carcass (or the equivalent) is believed to be optimum and acceptable under all known regulations.

For injection into poultry, the preferred formula, if not liquid at ambient conditions, should be warmed to slightly above the melting point of 76° F. and preferably to a range of 80° to 85° F. It may be then injected by any of several well-known techniques such as those disclosed in the prior art identified previously. If the material is injected through hollow needles that are passed through the skin of the bird, it is preferred that the carcass be first chilled to below 50° F., and the injection of the formula be made at a plurality of points, including at least two points on each breast. It is of further advantage to utilize even more injection sites including the legs of the fowl (although dark poultry meat being relatively more moist than white meat does not benefit as greatly as the latter from this process). In this way, the formula when added in quantities ranging from 1 to 6 percent of the bird weight will congeal almost immediately upon entry into the bird and virtually none will be lost through escape from the injection site.

However, upon heating to cooking temperatures, a portion of the formula will ooze as a liquid from the passageways made by the penetrating injection needles. Some persons may regard this as desirable as the formula is an excellent basting material and will prevent the skin and surface of the foul from becoming dry or burning. However, the greatest advantage of the invention and improvement in eating qualities of the meat can be obtained if the formula is not lost from the flesh in that manner.

The quantity of formula expelled or escaping from the flesh upon cooking may be reduced by introducing the material into the flesh by means other than penetration through the skin. The high-pressure spray injection technique may be desirable in this regard. Also, if injection by needle through the skin is performed, the quantity of the formula lost upon cooking may be minimized by injecting the formula at relatively higher pressures. Normal injection by this technique should be carried out under pressures ranging from 30 to 60 p.s.i.g. The use of relatively higher pressures within this range will result in the oil formula being dispersed further between the tissue fibers and thereby less available to escape through the injection site. Relatively lower pressures within the range will tend, however, to form localized pockets of formula near the injection site, thus, the formula is relatively available to escape therethrough upon being heated to liquid state. It should also be noted that pressures in excess of about 60 p.s.i.g. may tend to cause the injected material to rupture the tissue structure causing an undesirable discontinuity in the meat and possible release of the material upon cooling, either through the injection site or fissures.

It is preferred to utilize a technique for injecting poultry differing from the prior art and which is the subject of another invention. In brief, the preferred technique is to distribute the formula throughout virtually the length of both breast areas of a bird by injecting outwardly from a single longitudinal channel in each breast. This performed by using hollow needles that are extended parallel and close to the skeletal breast structure of a bird from either the anterior or posterior visceral incisions. Usually, this technique involves the insertion of relatively long needles, having a number of orifices spaced along the length thereof, through the small area of flesh normally exposed at the eviscerable openings in the bird.

In preparing the emulsions, the ratio of the ingredients may be varied significantly from the preferred percentages in accordance with the user's particular taste preferences. While the major improvement in eating quality is believed to be attributable to the fat component, and while most persons tested appear to favor that ingredient, certain persons prefer lower quantities of fat, sometimes for dietary reasons, yet appreciate a tenderizing and moisturizing improvement that is obtained by adding relatively greater proportions of water. The emulsions of the present invention provide wide latitude in the amounts of each ingredient. Accordingly, the percentage of respective ingredients should not be viewed as a limiting factor but as a guide to obtaining maximum improvement. Similarly, certain additional ingredients may be desired. For example, small amounts of food grade phosphates are regarded in the art as improving the moisture retention properties of meat. Monosodium glutamate is also regarded as a flavor and moisture enhancer. These materials, and others, may be incorporated in the fat emulsion formula. Also, the percent of salt may be varied to individual tastes and may even be eliminated.

EXAMPLE I

Twenty-four chilled turkey carcasses were divided into three lots of eight turkeys each, and each turkey was injected in one breast only by passing multiple needles through the skin. In each instance, a quantity of a warmed emulsion comprising 84 percent coconut oil, 12 percent water, 3 salt, ½ percent mixed emulsifier and ½ percent flavoring and color was injected and observed to congeal quickly without loss. The carcasses of one lot were injected with an amount of emulsion equal to 1 percent of the carcass weight (equivalent to the amount that would be injected in each breast where a total of 2 percent, by weight, emulsion would be added to a carcass). Similarly the carcasses of the two other lots were injected with 1½ and 2 percent emulsion (equivalent to 3 percent and 4 percent, respectively). All of the turkeys were roasted under substantially identical conditions and individual roast turkeys were demonstrated to small groups of adult men and women consumers taken at random from visitors to a public building. Each consumer sampled meat taken from both the injected and untreated breasts. The great majority of the consumers preferred to injected sample; and there was a preceptible favoring of meat injected at the 1½ percent level (equivalent to 3 percent by carcass weight). Specific results are as follows:

|  | lot A equiv. 2% | lot B equiv. 3% | lot C equiv. 4% |
| --- | --- | --- | --- |
| Number of persons sampled (In numbers of persons) | 30 | 40 | 37 |
| Overall preference |  |  |  |
| injected side | 19 | 30 | 21 |
| noninjected side | 7 | 7 | 14 |
| no preference | 4 | 3 | 2 |
| Flavor preference |  |  |  |
| injected side | 18 | 28 | 19 |
| noninjected side | 6 | 6 | 12 |
| no preference | 6 | 66 | 6 |
| Found Juicier |  |  |  |
| injected side | 20 | 27 | 22 |
| noninjected side | 8 | 8 | 10 |
| no preference | 2 | 5 | 5 |
| Found Tenderer |  |  |  |
| injected side | 19 | 26 | 17 |
| noninjected side | 4 | 6 | 10 |
| no preference | 7 | 8 | 10 |

EXAMPLE II

A comparison test was devised to ascertain whether meat pieces benefited from the invention as well as turkey carcasses. For this test, emulsion according to the preferred formula of example I was prepared, warmed to about 80° F. and injected by multiple needles passed through the skin into both breasts of two chilled turkey carcasses and into chilled breasts that had previously been removed from two turkey carcasses. Each carcass was injected with an amount of emulsion equaling 3 percent of the carcass weight while the separated breasts were injected with amounts equaling 7 percent of the breast weight (a percentage determined to be equivalent to the relative amounts injected into the carcass breast tissue). In each instance the emulsion set up quickly and did not ooze from the flesh. All items were roasted under similar conditions, excepting the carcasses were roasted for a substantially longer period due to the greater mass, and examined.

|  | Whole turkeys | | Turkey breasts | |
| --- | --- | --- | --- | --- |
| Item identification No | 1 | 2 | 3 | 4 |
| Total weight including emulsion (grams) | 5,175 | 5,134 | 2,324 | 2,300 |
| Temperature before roasting, ° F | 52 | 52 | 52 | 52 |
| Oven temperature, ° F | 325 | 325 | 325 | 325 |
| Roasting time | 4'30" | 4'20" | 3'3" | 3'32" |
| Roast temperature, ° F.: |  |  |  |  |
| Breast | 175 | 175 | 175 | 175 |
| Thigh | 183 | 174 |  |  |
| Weight of roast (grams) | 3,870 | 3,735 | 1,732 | 1,671 |
| Cooking shrink, percent | 25.2 | 27.2 | 25.5 | 27.3 |

After roasting the breasts were cut from the turkey carcasses 1 and 2 and submitted along with the breast items 3 and 4 for taste panel evaluation. All items were found to be acceptable and superior to noninjected turkey in areas of flavor, juiciness, and tenderness. A few tasters indicated that items 1 and 2 were more tender than items 3 and 4 which may be accounted for by the longer cooking time for the whole carcass items.

EXAMPLE III

Turkey breasts were removed from a number of carcasses and separated into four test lots. A preferred emulsion of the formula of example I was prepared and injected into the breasts in various amounts and by two injection techniques. The breasts of three lots (A, B, C) were injected by multiple needles passed through the skin with amounts of emulsion equaling 7, 9 and 11 percent of the breast weights, respectively (approximately equivalent to injecting breasts of carcasses at 3, 4 and 5 percent of carcass weight). The fourth lot (lot D) was injected at the 9 percent level by inserting a single, multiple-orifice needle longitudinal of each breast, under the skin and across the tissue fibers of the pectoralis superficialis muscle. In each instance, the emulsion set up promptly and did not ooze out. All of the breasts were roasted under substantially identical conditions in a 325° F. oven for periods of 3 to 3½ hr. and until reaching an internal temperature of 175° F. The following data was collected:

| Lot | A | B | C | D |
| --- | --- | --- | --- | --- |
| Emulsion level | 7 | 9 | 11 | 9 |
| Avg. weight of breasts (grams) | 2160 | 2529 | 2134 | 2155 |
| Avg. weight of roasts (grams) | 1703 | 1853 | 1545 | 1709 |
| Cooking shrink | 21.2% | 26.7% | 27.6% | 20.7% |

Examination for taste and tenderness showed that all items rated superior in flavor, juiciness and tenderness as compared to untreated flesh, and marked preference was noted for breasts injected at the 9 and 11 percent levels, particularly for lot D. The data also show that the technique of injection utilized for lot D resulted in significantly lower shrink during cooking.

EXAMPLE IV

Whole turkeys injected with the preferred emulsion of example I were compared with whole turkeys injected with aqueous solutions of salt and flavoring, and salt and monosodium glutamate. In each instance, chilled turkeys (35°–38° F.) were injected in both breasts with a total of 3 percent, by weight, of fluid emulsion or solution pumped through long, multiple-orifice needles that were inserted longitudinally of the carcass entirely beneath the skin from points on the pectoralis superficialis exposed by displacing the skin at the posterior evisceral incision. Equal amounts were injected in each breast of a bird, but the needle was inserted twice in each right breast and thrice in each left breast. In lot A the preferred emulsion was injected without any loss from the injection sites. In lot B an aqueous solution containing 5 percent NaCl and 0.5 percent 3H3 (flavoring) was injected with some material visible escaping upon removal of the needle. In lot C an aqueous solution containing 5 percent NaCl and 0.5 percent monosodium glutamate was injected, also with some visible loss. The following data was collected:

| Lot | A | B | C |
| --- | --- | --- | --- |
| Average weight (grams) | 5124 | 5065 | 5043 |
| Average roast weight (grams) | 3815 | 3780 | 3880 |
| Average roast temperature | | | |
| Breast | 175° F. | 170° F. | 170° F. |
| Thigh | 184° F. | 180° F. | 180° F. |
| Average cooking shrink | 25.5% | 25.4% | 23.1% |

Examination by a panel of tasters demonstrated a preference for lot A which was found to be more flavorful and juicy than lots B and C. Specific observations were that meat samples taken from the breasts of lot A were the most flavorful, tender and juicy to taste and gave the best visual appearance. Lots B and C were both thought to be somewhat salty to taste and of about equal tenderness, although less tender than lot A. Meat samples from lot C were thought to be less juicy than lot A but more juicy than lot B. No distinction was noted between meat taken from the left and right breasts of any one bird.

EXAMPLE V-IX

Chilled turkey breast portions (separated from the carcass) were injected in accordance with the technique employed for lot D of example III with 9 percent, by weight, of emulsions comprising 84 percent oil fraction, 12 percent water, 3 percent salt, ½ percent mixed emulsifier and ½ percent flavoring. The oil fraction was varied for each test according to the following schedule:

| Example | Oil Fraction |
| --- | --- |
| V | 80% coconut oil, 20% cottonseed stearine (completely interesterified) |
| VI | 90% coconut oil, 10% oleo oil |
| VII | 70% coconut oil, 15% coco butter, 15% lard oil |
| VIII | 50% coconut oil, 50% corn oil |
| IX | 30% coconut oil, 70% soybean oil—partially hydrogenated (iodine no. 75) |

In each instance the emulsion was warmed to liquid state and injected through a single site; and no emulsion was observed to exude therefrom upon withdrawal of the needle. Subsequent roasting and tasting demonstrated that acceptable and improved tenderness and juiciness were obtained. The samples were not judged to be as desirable as product utilizing the preferred formula which was felt to be superior in flavor.

EXAMPLE X

Chilled turkey breasts were injected as in the preceding examples with 9 percent by weight of an emulsion comprising 70 percent coconut oil, 26 percent water, 3 percent salt, ½ percent mixed emulsifier, and ½ percent flavoring. No emulsion visibly escaped during or immediately following injection. Upon roasting and tasting, the flesh was judged comparable to the samples of examples V-IX.

Obviously many modifications and variations of the invention as hereinbefore set forth may be made without departing from the spirit and scope thereof, and, therefore, only such limitations should be imposed as are indicated in the appended claims.

We claim:
1. A method for treating meat to improve the eating qualities thereof, said method comprising: chilling an item of meat to a temperature below about 50° F., and injecting into the tissue of said chilled item about 1–11 percent by weight of said item of an emulsion comprising a water fraction and an oil fraction, the water and oil fractions being mixed in a ratio of 40–90 percent oil and 59–9 percent water with less than 1 percent of mixed hydrophilic-lipophilic emulsifiers, and said oil fraction including from 30 percent to 100 percent of a lauric acid oil to provide a melting point of the emulsion in the range of about 76° to 110° F. and a very short plastic range approximating those of lauric acid oils.

2. A method in accordance with claim 1, for the improvement of the qualities of poultry wherein poultry flesh is first chilled and wherein the emulsion injected is comprised of about 84 percent oil fraction, 12 percent water, 3 percent salt and 1 percent combined emulsifier, spice and color ingredients.

3. The method of claim 2 wherein the oil fraction consists of one of coconut oil and palm kernel oil.

* * * * *